Dec. 21, 1937.  E. L. RICE  2,103,180
ROTARY MOTOR
Filed June 15, 1933
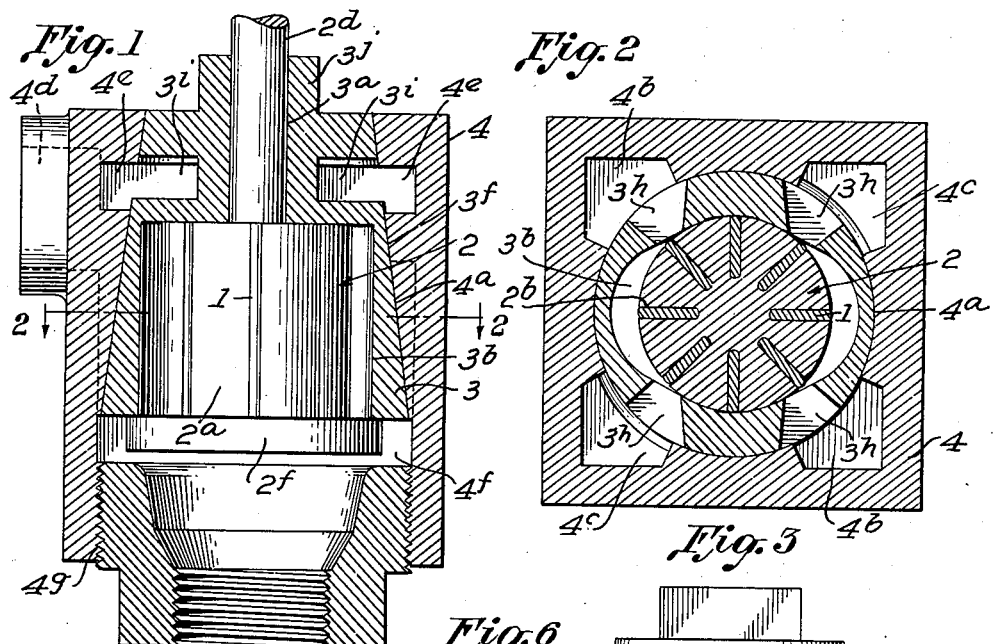
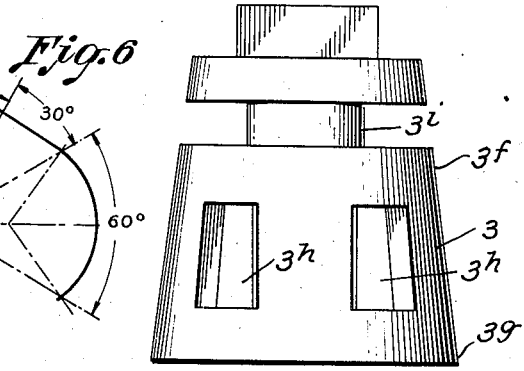
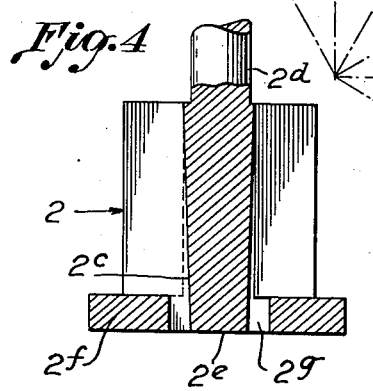
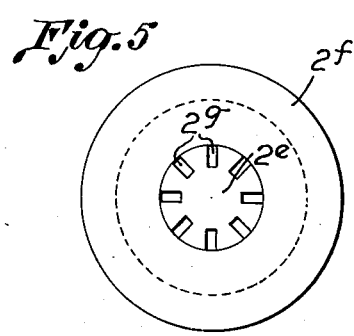
Inventor:
Edwin Leroy Rice Patented Dec. 21, 1937

2,103,180

UNITED STATES PATENT OFFICE 2,103,180

ROTARY MOTOR

Edwin Leroy Rice, Silver Spring, Md., assignor to Rice Manufacturing and Aerial Transport Corporation, a corporation of Arizona Application June 15, 1933, Serial No. 675,890

14 Claims. (Cl. 121—92)

This invention relates to piston devices and rotary engines.

An object of this invention is to improve and make permanent a seal in a rectangular chamber, and to utilize the pressure of the motivating or motivated fluid in sealing, to the end of making the device wear in instead of wearing out.

A further object of this invention is to provide for floating a rotor both laterally and longitudinally in the motivating or motivated fluid, and enabling a motor, and, for instance, a propeller driven by the motor, to find its own center of gyration.

A further object of this invention is to provide an improved reversing means.

A further object is to generally improve and simplify such devices.

With the foregoing and other objects in view, I have invented the device shown in the drawings and described in the specification, in which:

Figure 1 is a longitudinal section through a unit;

Figure 2 is a section at 2—2 of Figure 1;

Figure 3 is a detailed plan view of the housing;

Figure 4 is a fragmentary longitudinal section, partly broken away, through the piston carrier;

Figure 5 is an end view of the showing in Figure 4;

Figure 6 is a diagrammatic showing of the configuration of the piston race.

Like reference numerals in the drawings indicate like parts in the specification, in which there are eight equally spaced vanes or blades 1, and a rotor 2 serving as a carrier for the vanes. This rotor is of cylindrical form and comprises a hub portion 2a which is provided with equally spaced slots 2b, which slots are provided at the bottom with a taper 2c and which slots are adapted to slidingly receive the blades. The rotor 2 is also provided with an extending shaft 2d at one end, and at the other end, with a concentrically projecting boss 2e. The slots 2b extend through the boss and the greatest depth of the slots is at the boss end. Forced on to this boss is a washer 2f, the thickness of the washer corresponding to the length of the boss and the diameter of the washer being greater than that of the hub, so that it forms a projecting flange. When the washer is thus assembled, the slots in the boss form holes 2g leading from the root of the vane slots to the exterior of the washer. There is also provided a housing 3 for the rotor, the housing being bored in two stepped diameters and faced at the end of the largest diameter. The smaller bore 3a is concentric and of a size adapted to loosely receive the shaft of the rotor, and the larger bore 3b is oblong in the form of a socket, which socket receives the rotor and is covered by the flange of the washer 2f. The periphery 3f of this housing is of conical form, the greatest diameter of the cone being at the faced or washer end 3g. The outer or conical periphery of the housing serves as a valve for four radial ports 3h. There is a 60 degree spacing between the ports, and the vanes are 45 degrees apart, so that there are always two blades between the ports. The consequence of this is that there is no dependence on a close fit diametrically between the carrier and housing in order to seal between the chambers. This also permits of ample allowance for expansion by temperature without binding and for the floating of the rotor laterally in the motivating or motivated fluid.

When the rotor is in place, by inserting its shaft into the shaft hole 3a, pressure from the washer end of the carrier will force the hub against the bottom of the socket and will force the flange against the faced end of the housing, so that there will be two crescent shaped chambers formed between the rotor and housing, the end walls of which chambers will be formed, one from the housing and the other from the flange or shroud-like extension of the washer. Thus one of the end walls will rotate and the other end wall will be stationary. Longitudinal or axial pressure against the outer side of the washer acts against the outer side of the washer and acts against the rotor as it would against a poppet valve, and the action is that of grinding in or lapping in a valve, so that it wears in instead of wearing out, and the longer it wears the better it gets. Another result in this structure is that the rotor finds its own center of gyration by reason of the looseness of its mount and by reason of the fact that there is a balanced lateral pressure together with a cooperating end pressure, whereby the rotor floats both longitudinally and laterally in the motivating or motivated fluid.

This invention automatically dissipates the complications of permanency of seal and balance, and enables the competitive use of rotary engines in fields in which they were hitherto non-competitive and creates an effective combination turbine and piston device.

The fluid pressure enters longitudinally and is directed against the exterior of the washer with a consequent passage through the holes 2g to beneath the vanes, the resultant being that the vanes are forced outwardly and also by reason of the end pressure are forced longitudinally against the bottom of the socket. The resultant is that all points of the rectangular chamber are sealed and are yieldingly held in permanently sealed relation against wear.

There is also provided a shell 4 which is internally bored at 4a with a conical hole forming a valve seat for the external valve surface of the housing. Internally of the shell 4 and running longitudinally are two pairs of channels 4b and 4c, the channels of each pair being diametrically opposed. The channels lead from over the ports when the housing and shell are assembled, one pair of the channels leading toward one end of the housing, and the other pair leading toward the other end of the housing.

There is provided in the housing an annulus 3i into which, when assembled, one pair of the shell channels lead, the annulus formng a connecting conduit to connect such channels. In the shell 4 is a pipe hole 4d which leads into an internal annulus 4e of the shell, which internal annulus co-mates with an annulus 3i in the housing. The other pair of channels leads to the flanged end of the device where a chamber 4f is formed, which chamber is closed by a pipe fitting screwed into pipe threads 4g internal of the shell 4 and which threads are of a diameter permitting the passage or insertion of the housing, so that when a fluid under pressure is admitted through the pipe connection at this point, the fluid is directed against the washer and also passes through one pair of the shell channels and thence through one pair of the ports; but if the housing is turned 90 degrees in relation to the shell, then the fluid passes through the other pair of ports, thus reversing the direction of rotation of the rotor. When used as a pump, the intake is preferably at the opposite end of the shell from that when used as a motor, and the built up pressure of the fluid acts backwardly against the washer. A rectangular head 3j is provided on the protruding portion of the housing at the shaft end to be engaged by a wrench or other reversing lever.

I claim:

1. A piston carrier comprising a radially slotted hub and a wall member carried with the hub and conduits leading through the wall member to the slots.

2. The combination of a housing having an internal valve seat, a shell having an external conical surface co-mating with the valve seat to form a reverse valve and an internal socket, ports passing from the valve to the socket, a rotor adapted to rotate in the socket and conduits internal of the shell leading to the ports.

3. The combination of a rectangular housing having an internal valve seat and internal conduits alternately leading to opposite ends of the housing, a shell having an external conical surface co-mating with the valve seat to form a reverse valve and having an internal socket for receiving a rotor, ports penetrating the shell from the valve to the socket, the conduits leading to the ports.

4. A rotor comprising a slotted hub, vane slots extending longitudinally of the hub, a boss adjacent the hub and concentric therewith, a washer adapted to form a flange and forced on the hub against the hub, the slots extending into the hub beneath the washer to form fluid conduits through the washer.

5. The combination of vanes, a rotor for carrying the vanes, a housing for the rotor, chamber means between the housing and rotor, ports leading radially through the housing to the chamber, conduits leading centrally of the rotor to beneath the vanes and a chamber connected with the ports and central conduits.

6. The combination of vanes, a rotor for carrying the vanes, a housing provided with an oblong socket adapted to receive the rotor and to form chambers between the housing and rotor, a flange upon the rotor adapted to cover the socket and form an inclosure for the chambers and means for conducting fluid outwardly over the flange to the chambers and centrally beneath the vanes.

7. A rotor comprising a hub provided with longitudinal slots having tapered bottoms to the slots, a boss adjacent the hub and concentric therewith, the slots extending through the boss, a washer adapted to fit over the boss and form a flange at the end of the hub and to provide central conduits for leading fluid pressure along the bottoms of the slots.

8. A piston carrier comprising a hub, a washer like wall flange adjacent the hub, a shaft, piston channels in the hub parallel with the shaft and fluid conduits leading centrally through the flange to the channels.

9. The combination of a rotor, a housing for the rotor, laterally oppositely disposed closed chambers between the rotor and housing adapted to form a lateral fluid float for the rotor, a fluid, piston means adapted to pass through the chambers and cooperate with the fluid, and an end chamber connected with the lateral chambers and adapted to cooperate with the lateral chambers to float the rotor laterally and longitudinally in the fluid.

10. The combination of a rotor and stator, a socket in the stator adapted to receive the rotor and to form oppositely disposed closed chambers between the stator and rotor, a shaft carried by the rotor and adapted to support the rotor from one end only, a flange carried by the rotor at its other end, the flange adapted to cover the socket, means for rotating the rotor and means for yieldingly urging the flange to cover the socket.

11. The combination of a rotary engine provided with a rotor and a valve for reversing the direction of rotation of the engine, the valve of taper form and surrounding the rotor.

12. The combination of a rotor, a stator, a valve on the periphery of the rotor, a seat for the valve internal of the stator, fluid means for rotating the rotor, a flange upon the rotor, a fluid chamber adapted to direct the fluid against the flange and valve to seat the rotor against the stator and the valve against the valve seat.

13. The combination of a rotor, a housing for the rotor, a shell for the housing, means internal of the shell and external of the housing for forming a reversing valve, fluid means for rotating the rotor, and a chamber adapted to direct the fluid against the rotor and housing to keep the rotor and housing in place.

14. The combination of a rotor, vanes carried by the rotor, a housing for the rotor, a socket in the housing, a pair of diametrically oppositely set chambers between the rotor and housing within the socket, port means in the housing, the ports and vanes so relatively spaced as to seal between the chambers and to allow a loose fit between the rotor and housing, a cover for the socket carried by the rotor, and fluid means for urging the cover in place.

EDWIN LEROY RICE.